United States Patent [19]

Merchant

[11] Patent Number: 5,196,137

[45] Date of Patent: * Mar. 23, 1993

[54] AZEOTROPIC COMPOSITION OF 1,1,1,2,3,4,4,5,5,5-DECAFLUOROPENTANE AND TRANS-1,2-DICHLOROETHYLENE, CIS-1,2-DICHLOROETHYLENE OR 1,1-DICHLORETHANE

[75] Inventor: Abid N. Merchant, Wilmington, Del.

[73] Assignee: E. I. Du Pont de Nemours and Company, Wilmington, Del.

[*] Notice: The portion of the term of this patent subsequent to Nov. 12, 2008 has been disclaimed.

[21] Appl. No.: 769,383

[22] Filed: Oct. 1, 1991

[51] Int. Cl.$^5$ .......... C09K 5/04; C11D 7/30; C11D 7/50; C23G 5/028

[52] U.S. Cl. .......... 252/172; 60/651; 62/114; 134/12; 134/31; 134/38; 134/40; 134/42; 174/176 F; 174/25 G; 252/2; 252/8; 252/67; 252/162; 252/194; 252/305; 252/364; 252/571; 252/DIG. 9; 264/53; 264/DIG. 5; 521/98; 521/131

[58] Field of Search .......... 252/67, 162, 172, 364, 252/DIG. 9, 2, 8, 194, 305, 571; 62/114; 134/12, 31, 38, 40, 42; 264/53, DIG. 5; 174/176 F, 25 G; 60/651; 521/98, 131

[56] References Cited

U.S. PATENT DOCUMENTS

| | | | |
|---|---|---|---|
| 3,881,949 | 5/1975 | Brock | 134/31 |
| 4,418,185 | 11/1983 | Throckmorton et al. | 526/201 |
| 5,059,728 | 10/1991 | Li et al. | 570/134 |
| 5,064,559 | 11/1991 | Merchant et al. | 252/171 |
| 5,064,560 | 11/1991 | Merchant | 252/171 |
| 5,100,572 | 3/1992 | Merchant | 252/171 |
| 5,118,359 | 6/1992 | Li et al. | 134/42 |

FOREIGN PATENT DOCUMENTS 431458 6/1991 European Pat. Off.

Primary Examiner—Linda D. Skaling
Attorney, Agent, or Firm—P. Michael Walker

[57] ABSTRACT

Azeotropic mixtures of 1,1,1,2,3,4,4,5,5,5-decafluoropentane (HFC-43-10mee) and trans-1,2-dichloroethylene, cis-1,2-dichloroethylene or 1,1-dichloroethane are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

8 Claims, No Drawings

AZEOTROPIC COMPOSITION OF 1,1,1,2,3,4,4,5,5,5-DECAFLUOROPENTANE AND TRANS-1,2-DICHLOROETHYLENE, CIS-1,2-DICHLOROETHYLENE OR 1,1-DICHLORETHANE

FIELD OF THE INVENTION

This invention relates to mixtures of fluorinated hydrocarbons and more specifically relates to azeotropic or azeotrope-like compositions comprising 1,1,1,2,3,4,4,5,5,5-decafluoropentane (HFC-43-10mee, or $CF_3CHFCHFCF_2CF_3$) and trans-1,2-dichloroethylene, cis-1,2-dichloroethylene, or 1,1-dichloroethane. Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a cleaning agent or solvent. Cleaning agents are used, for example, to clean electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent.

Preferably, cleaning agents should have a low boiling point, nonflammability, low toxicity, and high solvency power so that flux and flux-residues can be removed without damaging the substrate being cleaned. Further, it is desirable that the cleaning agents be azeotropic or azeotrope-like so that they do not tend to fractionate upon boiling or evaporation. This behavior is desirable because if the cleaning agent were not azeotropic or azeotrope-like, the more volatile components of the cleaning agent would preferentially evaporate, and would result in a cleaning agent with a changed composition that may become flammable and that may have less-desirable solvency properties, such as lower rosin flux solvency and lower inertness toward the electrical components being cleaned. Theazeotropic character is also desirable in vapor degreasing operations because the cleaning agent is generally redistilled and employed for final rinse cleaning.

Fluorinated hydrocarbons are also useful as blowing agents in the manufacture of close-cell polyurethane, phenolic and thermoplastic foams. Insulating foams depend on the use of blowing agents not only to foam the polymer, but more importantly for the low vapor thermal conductivity of the blowing agents, which is an important characteristic for insulation value.

Fluorinated hydrocarbons may also be used as refrigerants. In refrigeration applications, a refrigerant is often lost through leaks during operation through shaft seals, hose connections, solder joints, and broken lines. In addition, the refrigerant may be released to the atmosphere during maintenance procedures on refrigeration equipment. Accordingly, it is desirable to use refrigerants that are pure fluids or azeotropes as refrigerants. Some nonazeotropic blends of refrigerants may also be used, but they have the disadvantage of changing composition when a portion of the refrigerant charge is leaked or discharged to the atmosphere. Should these blends contain a flammable component, they could also become flammable due to the change in composition that occurs during the leakage of vapor from refrigeration equipment. Refrigerant equipment operation could also be adversely affected due to this change in composition and vapor pressure that results from fractionation.

Aerosol products employ both individual halocarbons and halocarbon blends as propellant vapor pressure attenuators in aerosol systems. Azeotropic mixtures, with their constant compositions and vapor pressures are useful as solvents and propellants in aerosols.

Azeotropic or azeotrope-like compositions are also useful as heat transfer media, gaseous dielectrics, fire extinguishing agents, power cycle working fluids such as for heat pumps, an inert medium for polymerization reactions, as a fluid for removing particulates from metal surfaces, and as a carrier fluid that may be used, for example, to place a fine film of lubricant on metal parts.

Azeotropic or azeotrope-like compositions are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists (for example, with the addition of a chlorohydrocarbon such as 1,1,1-trichloroethane or trichloroethylene).

Some of the fluorinated hydrocarbons that are currently used in these applications have been theoretically linked to depletion of the earth's ozone layer and to global warming. What is needed, therefore, are substitutes for fluorinated hydrocarbons that have low ozone depletion potentials and low global warming potentials.

SUMMARY OF THE INVENTION

The present invention relates to the discovery of azeotropic or azeotrope-like compositions comprising admixtures of effective amounts of 1,1,1,2,3,4,4,5,5,5-decafluoropentane (HFC-43-10mee, or $CF_3CHFCHFCF_2CF_3$) and trans-1,2-dichloroethylene, cis-1,2-dichloroethylene or 1,1-dichloroethane. One way to define the invention is in terms of weight percents of the components at atmospheric pressure. Azeotropic or azeotrope-like mixtures of HFC-43-10mee and trans-1,2-dichloroethylene include about 58–68 weight percent HFC-43-10mee and about 32–42 weight percent trans-1,2-dichloroethylene; azeotropic or azeotrope-like mixtures of HFC-43-10mee and cis-1,2-dichloroethylene include about 63–73 weight percent HFC-43-10mee and about 27–37 weight percent cis-1,2-dichloroethylene; and azeotropic or azeotrope-like mixtures of HFC-43-10mee and 1,1-dichloroethane include about 68–78 weight percent HFC-43-10mee and about 22–32 weight percent 1,1-dichloroethane, all at atmospheric pressure.

Compositions of the invention are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

DETAILED DESCRIPTION OF THE INVENTION

The compositions of the instant invention are substantially constant boiling, azeotropic or azeotrope-like compositions, or mixtures, comprising admixtures of effective amounts of 1,1,1,2,3,4,4,5,5,5-decafluoropentane (HFC-43-10mee, or $CF_3CHFCHFCF_2CF_3$, boiling point=53° C.) and trans-1,2-dichloroethylene (CHClCHCl, boiling point=48° C.), cis-1,2-dichloroethylene (CHClCHCl, boiling point=60° C.), or 1,1-dichloroethane ($CHCl_2CH_3$, boiling point=57° C.) to form an azeotropic or azeotrope-like composition.

Effective amounts of the 1,1,1,2,3,4,4,5,5,5-decafluoropentane and trans-1,2-dichloroethylene, cis-1,2-dichloroethylene or 1,1-dichloroethane to form an azeotropic or azeotrope-like composition, when defined in terms of weight percent of the components at atmospheric pressure, include the following.

Substantially constant-boiling, azeotropic or azeotrope-like compositions of HFC-43-10mee and trans-1,2-dichloroethylene comprise about 58–68 weight percent HFC-43-10mee and about 32–42 weight percent trans-1,2-dichloroethylene. These compositions boil at about 37.3°+/−1.6° C. at substantially atmospheric pressure. A preferred composition of the invention is the azeotrope, which comprises about 63.2 weight percent HFC-43-10mee and about 36.8 weight percent trans-1,2-dichloroethylene, and which boils at 37.3° C. at atmospheric pressure.

Substantially constant-boiling, azeotropic or azeotrope-like compositions of HFC-43-10mee and cis-1,2-dichloroethylene comprise about 63–73 weight percent HFC-43-10mee and about 27–37 weight percent cis-1,2-dichloroethylene. These compositions boil at about 42.3°+/−1.2° C. at substantially atmospheric pressure. A preferred composition of the invention is the azeotrope, which comprises about 67.9 weight percent HFC-43-10mee and about 32.1 weight percent cis-1,2-dichloroethylene, and which boils at 42.3° C. at atmospheric pressure.

Substantially constant-boiling, azeotropic or azeotrope-like compositions of HFC-43-10mee and 1,1-dichloroethane comprise about 68–78 weight percent HFC-43-10mee and about 22–32 weight percent 1,1-dichloroethane. These compositions boil at about 43.0°+/−2.8° C. at substantially atmospheric pressure. A preferred composition of the invention is the azeotrope, which comprises about 73.0 weight percent HFC-43-10mee and about 27.0 weight percent 1,1-dichloroethane, and which boils at about 43.0° C. at atmospheric pressure By "azeotropic or azeotrope-like" composition is meant a constant boiling, or substantially constant boiling, liquid admixture of two or more substances that behaves as a single substance. One way to characterize an azeotropic or azeotrope-like composition is that the vapor produced by partial evaporation or distillation of the liquid has substantially the same composition as the liquid from which it was evaporated or distilled, that is, the admixture distills/refluxes without substantial composition change. Constant boiling or substantially constant boiling compositions, which are characterized as azeotropic or azeotrope-like, exhibit either a maximum or minimum boiling point, as compared with that of the nonazeotropic mixtures of the same components.

As used herein, the terms azeotropic and constant boiling are intended to mean also essentially azeotropic or essentially constant boiling. In other words, included within the meaning of these terms are not only the true azeotropes described above, but also other compositions containing the same components in different proportions, which are true azeotropes or are constant boiling at other temperatures and pressures, as well as those equivalent compositions which are part of the same azeotropic or constant boiling system and are azeotrope-like or substantially constant boiling in their properties. As is well recognized in this art, there is a range of compositions which contain the same components as the azeotrope, which not only will exhibit essentially equivalent properties for cleaning, refrigeration and other applications, but which will also exhibit essentially equivalent properties to the true azeotropic composition in terms of constant boiling characteristics or tendency not to segregate or fractionate on boiling.

For purposes of this invention, effective amount is defined as the amount of each component of the inventive compositions that, when combined, results in the formation of an azeotropic or azeotrope-like composition. This definition includes the amounts of each component, which amounts may vary depending upon the pressure applied to the composition, so long as the azeotropic or azeotrope-like, or constant boiling or substantially constant boiling compositions continue to exist at the different pressures, but with possible different boiling points. Therefore, effective amount includes the weight percentage of each component of the compositions of the instant invention, which form azeotropic or azeotrope-like, or constant boiling or substantially constant boiling, compositions at pressures other than atmospheric pressure.

It is possible to characterize, in effect, a constant boiling admixture, which may appear under many guises, depending upon the conditions chosen, by any of several criteria:

- The composition can be defined as an azeotrope of A, B and C, since the very term "azeotrope" is at once both definitive and limitative, and requires that effective amounts A, B and C form this unique composition of matter, which is a constant boiling admixture.
- It is well known by those skilled in the art that at different pressures, the composition of a given azeotrope will vary—at least to some degree—and changes in pressure will also change—at least to some degree—the boiling point temperature. Thus an azeotrope of A, B and C represents a unique type of relationship but with a variable composition which depends on temperature and/or pressure. Therefore compositional ranges, rather than fixed compositions, are often used to define azeotropes.
- The composition can be defined as a particular weight percent relationship or mole percent relationship of A, B and C, while recognizing that such specific values point out only one particular such relationship and that in actuality, a series of such relationships, represented by A, B and C actually exist for a given azeotrope, varied by the influence of pressure.
- Azeotrope A, B and C can be characterized by defining the composition as an azeotrope characterized by a boiling point at a given pressure, thus giving identifying characteristics without unduly limiting the scope of the invention by a specific numerical composition, which is limited by and is only as accurate as the analytical equipment available.

The following binary compositions are characterized as azeotropic or azeotrope-like in that compositions within these ranges exhibit a substantially constant boiling point at constant pressure. Being substantially constant boiling, the compositions do not tend to fractionate to any great extent upon evaporation. After evaporation, only a small difference exists between the composition of the vapor and the composition of the initial liquid phase. This difference is such that the compositions of the vapor and liquid phases are considered substantially the same and are azeotropic or azeotrope-like in their behavior.

1. 58–68 weight percent HFC-43-10mee and 32–42 weight percent trans-1,2-dichloroethylene;
2. 63–73 weight percent HFC-43-10mee and 27–37 weight percent cis1,2-dichloroethylene; and
3. 68–78 weight percent HFC-43-10mee and 22–32 weight percent 1,1-dichloroethane.

The following binary compositions of HFC-43-10mee and trans-1,2-dichloroethylene have been established, within the accuracy of the fractional distillation method, as a true binary azeotropes at substantially atmospheric pressure.

1. about 63.2 weight percent HFC-43-10mee and about 36.8 weight percent trans-1,2-dichloroethylene, boiling point of about 37.3° C.;
2. about 67.9 weight percent HFC-43-10mee and about 32.1 weight percent cis-1,2-dichloroethylene, boiling point of about 42.3° C.; and
3. about 73.0 weight percent HFC-43-10mee and about 21.0 weight percent 1,1-dichloroethane, boiling point of about 43.0° C.

The aforestated azeotropes have no ozone-depletion potentials, their Global Warming Potentials (GWP) are low and they have short atmospheric life spans, and are expected to decompose almost completely prior to reaching the stratosphere.

The azeotropes or azeotrope-like compositions of the instant invention permit easy recovery and reuse of the solvent from vapor defluxing and degreasing operations because of their azeotropic natures. As an example, the azeotropic mixtures of this invention can be used in cleaning processes such as described in U.S. Pat. No. 3,881,949, or as a buffing abrasive detergent.

Another aspect of the invention is a refrigeration method which comprises condensing a refrigerant composition of the invention and thereafter evaporating it in the vicinity of a body to be cooled. Similarly, still another aspect of the invention is a method for heating which comprises condensing the invention refrigerant in the vicinity of a body to be heated and thereafter evaporating the refrigerant.

A further aspect of the invention includes aerosol compositions comprising an active agent and a propellant, wherein the propellant is an azeotropic mixture of the invention; and the production of these compositions by combining said ingredients. The invention further comprises cleaning solvent compositions comprising the azeotropic mixtures of the invention.

The azeotropic or azeotrope-like compositions of the instant invention can be prepared by any convenient method including mixing or combining the desired component amounts. A preferred method is to weigh the desired component amounts and thereafter combine them in an appropriate container.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The 1,1,1,2,3,4,5,5-decafluoropentane of this invention may be prepared in the manner disclosed in U.S. patent application Ser. No. 07/595,839 filed Oct. 11, 1990, now abandoned, the text of which is incorporated herein by reference, which discloses a process for manufacturing polyfluoroolefins having at least 5 carbon atoms by reacting together two polyfluoroolefins in the presence of a catalyst of the formula $AlX_3$ where X is one or more of F, Cl or Br, provided X is not entirely F. A five carbon perfluoroolefinic starting material may be prepared by the reaction of hexafluoropropene (HFP) with tetrafluoroethylene (TFE). A six carbon perfluoroolefinic starting material may be prepared by the reaction of 1,1,1,4,4,4-hexafluoro-2,3-dichloro-2-butene with TFE to yield an intermediate product comprising perfluoro-2,3-dichloro-2-hexene which may then be converted to perfluoro-2-hexene by reaction with potassium fluoride in refluxing N-methyl pyrolidone. A mixture of seven carbon perfluoroolefinic starting materials may be prepared by the reaction of hexafluoro-propene with 2 moles of TFE.

The $CF_3CHFCHFCF_2CF_3$ of this invention may be prepared by a process which comprises the step of reacting an olefinic starting material prepared as described above in the vapor phase with hydrogen over a metal catalyst from the palladium group. The olefinic starting material for this process has the same number of carbon atoms as the desired dihydropolyfluoroalkanes and may be $CF_3CF=CFCF_2CF_3$, and has its olefinic bond between the carbon atoms which correspond to the carbons which bear the hydrogen in said dihydropolyfluoroalkane.

Unsupported metal catalysts and supported metal catalysts wherein the metal is palladium, rhodium or ruthenium are suitable for use in this process. Supports such as carbon or alumina may be employed. Palladium on alumina is the preferred catalyst.

The vapor phase reduction can be carried out at temperatures in the range of from about 50° C. to about 225° C.; the preferred temperature range is from about 100° C. to about 200° C. The pressure of the hydrogenation may vary widely from less than 1 atmosphere to 20 or more atmospheres. The molar ratio of hydrogen to olefinic starting material for this process is preferably between about 0.5:1 and 4:1, and is more preferably between about 0.5:1 and 1.5:1.

In the foregoing and in the following examples, unless otherwise indicated, all parts and percentages are by weight.

The entire disclosure of all applications, patents and publications, cited above and below, are hereby, incorporated by reference.

EXAMPLE 1

A solution which contained 65.35 weight percent HFC-43-10mee and 34.65 weight percent trans-1,2-dichloroethylene was prepared in a suitable container and mixed thoroughly.

The solution was distilled in a Perkin-Elmer Mode 251 Autoannular Spinning Band Still (200 plate fractionating capability), using a 50:1 reflux to take-off ratio.

Head and pot temperatures were read directly to 0.1° C. The pressure was at about 765.5 mmHg. Distillate compositions were determined by gas chromatography. Results obtained are summarized in Table 1.

TABLE 1
DISTILLATION OF: (65.35 + 34.65) HFC-43-10mee AND TRANS-1,2-DICHLOROETHYLENE (TRANS)

| CUTS | TEMPERATURE, °C. POT | TEMPERATURE, °C. HEAD | WT. % DISTILLED OR RECOVERED | WEIGHT PERCENTAGES HFC-43-10mee | WEIGHT PERCENTAGES TRANS |
|---|---|---|---|---|---|
| PRE | 38.3 | 36.6 | 9.5 | 64.2 | 35.9 |
| 1 | 38.3 | 36.9 | 20.5 | 64.8 | 35.2 |
| 2 | 38.4 | 37.0 | 32.1 | 63.7 | 36.3 |
| 3 | 38.5 | 37.3 | 44.1 | 63.3 | 36.7 |
| 4 | 38.8 | 37.6 | 53.7 | 62.7 | 37.7 |
| 5 | 39.2 | 37.9 | 62.8 | 61.6 | 38.4 |
| 6 | 39.5 | 38.1 | 73.1 | 61.0 | 39.0 |
| 7 | 42.0 | 38.5 | 81.9 | 59.9 | 40.3 |
| HEEL | — | — | 90.1 | 97.4 | 2.6 |

Analysis of the above data indicates very small differences between head temperatures and distillate compositions, as the distillation progressed. A statistical analysis of the data indicates that the true binary azeotrope of HFC-43-10mee and trans-1,2-dichloroethylene has the following characteristics at atmospheric pressure (99 percent confidence limits):

| HFC-43-10mee = | 63.2 +/− 4.4 wt. % |
|---|---|
| Trans = | 36.8 +/− 4.4 wt. % |
| Boiling point, °C. = | 37.3 +/− 1.6° C. |

EXAMPLE 2

A solution which contained 75.36 weight percent HFC-43-10mee and 24.64 weight percent cis-1,2-dichloroethylene was prepared in a suitable container and mixed thoroughly.

The solution was distilled in a twenty-five plate Oldershaw distillation column, using a 15:1 reflux to take-off ratio. Head and pot temperatures were read directly to 0.1° C. The pressure was at about 766.7 mmHg. Distillate compositions were determined by gas chromatography. Results obtained are summarized in Table 2.

TABLE 2
DISTILLATION OF: (75.36 + 24.64) HFC-43-10mee (4310) AND CIS-1,2-DICHLOROETHYLENE (CIS)

| CUTS | TEMPERATURE, °C. POT | TEMPERATURE, °C. HEAD | WT. % DISTILLED OR RECOVERED | WEIGHT PERCENTAGES HFC-4310 | WEIGHT PERCENTAGES CIS |
|---|---|---|---|---|---|
| PRE | 45.0 | 42.0 | 8.6 | 66.7 | 33.4 |
| 1 | 46.0 | 42.1 | 18.0 | 70.4 | 29.6 |
| 2 | 46.2 | 42.2 | 26.5 | 69.3 | 30.7 |
| 3 | 46.4 | 42.3 | 30.1 | 67.6 | 32.5 |
| 4 | 46.5 | 42.8 | 35.6 | 65.3 | 34.7 |
| 5 | 46.6 | 43.7 | 40.3 | 66.7 | 33.4 |
| 6 | 47.7 | 46.2 | 49.5 | 64.0 | 36.0 |
| 7 | 49.1 | 47.1 | 57.4 | 58.3 | 41.7 |
| 8 | 64.5 | 47.3 | 68.9 | 56.2 | 43.8 |
| HEEL | — | — | 90.6 | 59.1 | 40.9 |

Analysis of the above data indicates very small differences between head temperatures and distillate compositions, as the distillation progressed. A statistical analysis of the data indicates that the true binary azeotrope of HFC-43-10mee and cis-1,2-dichloroethylene has the following characteristics at atmospheric pressure (99 percent confidence limits):

| HFC-43-10mee = | 67.85 +/− 7.63 wt. % |
|---|---|
| CIS = | 32.15 +/− 7.63 wt. % |
| Boiling point, °C. = | 42.3 +/− 1.2° C. |

EXAMPLE 3

A solution which contained 73.09 weight percent HFC-43-10mee and 26.91 weight percent 1,1-dichloroethane was prepared in a suitable container and mixed thoroughly.

The solution was distilled in a Perkin-Elmer Mode 251 Autoannular Spinning Band Still (200 plate fractionating capability), using a 50:1 reflux to take-off ratio. Head and temperatures were read directly to 0.1° C. The pressure was at about 766.4 mmHg. Distillate compositions were determined by gas chromatography. Results obtained are summarized in Table 3.

TABLE 3
DISTILLATION OF: (73.09 + 26.91) HFC-43-10mee AND 1,2-DICHLOROETHANE (DCE)

| CUTS | TEMPERATURE, °C. POT | TEMPERATURE, °C. HEAD | WT. % DISTILLED OR RECOVERED | WEIGHT PERCENTAGES HFC-4310 | WEIGHT PERCENTAGES DCE |
|---|---|---|---|---|---|
| PRE | 45.8 | 42.2 | 8.0 | 73.2 | 26.8 |
| 1 | 46.4 | 42.8 | 20.6 | 73.1 | 26.9 |
| 2 | 47.0 | 43.3 | 31.7 | 73.2 | 26.8 |
| 3 | 47.8 | 43.6 | 45.6 | 72.4 | 27.7 |
| 4 | 49.0 | 45.2 | 57.5 | 70.6 | 29.4 |
| 5 | 49.2 | 45.8 | 70.7 | 69.4 | 30.6 |
| 6 | 53.0 | 46.1 | 80.0 | 66.7 | 33.3 |
| HEEL | — | — | 97.2 | 75.7 | 24.3 |

Analysis of the above data indicates very small differences between head temperatures and distillate compositions, as the distillation progressed. A statistical analysis of the data indicates that the true binary azeotrope of HFC-43-10mee and 1,1-dichloroethane has the following characteristics at atmospheric pressure (99 percent confidence limits):

| HFC-43-10mee = | 73.0 +/− 1.9 wt. % |
|---|---|
| 1,1-dichloroethane = | 27.0 +/− 1.9 wt. % |
| Boiling point, °C. = | 43.0 +/− 2.8° C. |

EXAMPLE 4

Several single sided circuit boards were coated with activated rosin flux and soldered by passing the boards over a preheater, to obtain top side board temperatures of approximately 200° F., and then through 500° F. molten solder. The soldered boards were defluxed separately, with the azeotropic mixtures cited in Examples 1, 2 and 3 above, by suspending a circuit board, first, for three minutes in the boiling sump, which contained the azeotropic mixture, then, for one minute in the rinse sump, which contained the same azeotropic mixture, and finally, for one minute in the solvent vapor above the boiling sump. The boards cleaned in each azeotropic mixture had no visible residue remaining thereon.

Other components, such as aliphatic hydrocarbons having a boiling point of 35°-85° C., hydrofluorocarbonalkanes having a boiling point of 35°-85° C., hydrofluoropropanes having a boiling point of between 35°-85° C., hydrocarbon esters having a boiling point between 30°-80° C., hydrochlorofluorocarbons having a boiling point between 25°-85° C., hydrofluorocarbons having a boiling point of 25°-85° C., hydrochlorocarbons having a boiling point between 35°-85° C., chlorocarbons and perfluorinated compounds, can be added to the azeotropic or azeotrope-like compositions described above without substantially changing the properties thereof, including the constant boiling behavior, of the compositions. Examples of such components, which typically do not exceed about 10 weight percent of the total composition, include the following.

| COMPOUND | FORMULA | boiling point, °C. |
|---|---|---|
| HFCF-123 | $CHCl_2CF_3$ | 27 |
| HCFC-141b | $CFCl_2CH_3$ | 32 |
| HCFC-225aa | $CHF_2CCl_2CF_3$ | 53 |
| HCFC-225ca | $CHCl_2CF_2CF_3$ | 52 |
| HCFC-225cb | $CHClFCF_2CF_2Cl$ | 56 |
| HCFC-225da | $CClF_2CHClCF_3$ | 50 |
| HFC-43-10 mf | $CF_3CH_2CF_2CF_2CF_3$ | 52 |
| HFC-43-10mcf | $CF_3CF_2CH_2CF_2CF_3$ | 52 |
| FC-C-51-12 | cyclo-$C_4F_6(CF_3)_2$ | 45 |
|  | $CH_3OCF_2CHFCF_3$ | 52 |
| HFC-C-456myc | cyclo-$CH_2CH_2CF_2CF(CF_3)$ |  |
| HFC-C-354 | cyclo-$CF_2CF_2CH_2CH_2$ | 50 |
|  | $C_4F_9CH=CH_2$ | 58 |
| MEK | $CH_3C(O)C_2H_5$ | 80 |
| THF | cyclo-$OC_4H_8$ | 66 |
| methyl formate | $HC(O)OCH_3$ | 32 |
| ethyl formate | $HC(O)OC_2H_5$ | 54 |
| methyl acetate | $CH_3C(O)OCH_3$ | 56 |
| ethyl acetate | $CH_3C(O)OC_2H_5$ | 77 |
| cyclohexane |  | 81 |
| hexane |  | 69 |
| cyclopentane |  | 49 |
| acetone |  | 56 |
| 1,2-dichloroethane |  | 84 |
| acetonitrile |  | 82 |
| methylene chloride |  | 40 |

Additives such as lubricants, corrosion inhibitors, stabilizers, surfactants, dyes and other appropriate materials may be added to the novel compositions of the invention for a variety of purposes provided they do not have an adverse influence on the composition, for their intended applications. Examples of stabilizers include nitromethane and nitroethane.

I claim:

1. An azeotropic or azeotrope-like composition consisting essentially of about 58 to 68 weight percent 1,1,1,2,3,4,4,5,5,5-decafluoropentane and about 32 to 42 weight percent trans-1,2-dichloroethylene wherein said composition boils at about 37.3° C.±1.6° C. at substantially atmospheric pressure.

2. The azeotropic or azeotrope-like composition of claim 1, consisting essentially of about 63.2 weight percent 1,1,1,2,3,4,4,5,5,5-decafluoropentane and about 36.8 weight percent trans-1,2-dichloroethylene.

3. An azeotropic or azeotrope-like composition consisting essentially of about 63 to 73 weight percent 1,1,1,2,3,4,4,5,5,5-decafluoropentane and about 27 to 37 weight percent cis-1,2-dichloroethylene wherein said composition boils at about 12.3° C.±1.2° C. at substantially atmospheric pressure.

4. The azeotropic or azeotrope-like composition of claim 3, consisting essentially of about 67.9 weight percent 1,1,1,2,3,4,4,5,5,5-decafluoropentane and about 32.1 weight percent cis-1,2-dichloroethylene at about atmospheric pressure.

5. An azeotropic or azeotrope-like composition consisting essentially of about 68 to 78 weight percent 1,1,1,2,3,4,4,5,5,5-decafluoropentane and about 22-32 weight percent 1,1-dichloroethane wherein said composition boils at about 43.0° C.±2.8° C. at about atmospheric pressure.

6. The azeotropic or azeotrope-like composition of claim 5, consisting essentially of about 73.0 weight percent 1,1,1,2,3,4,4,5,5,5-decafluoropentane and about 27.0 weight percent 1,1-dichloroethane at about atmospheric pressure.

7. A process for cleaning a solid surface comprising treating said surface with an azeotropic or azeotrope-like composition of any of claims 1 through 6.

8. A process for producing refrigeration, comprising condensing an azeotropic or azeotrope-like composition of any of claims 1 through 6, and thereafter evaporating said composition in the vicinity of a body to be cooled.

* * * * *

UNITED STATES PATENT AND TRADEMARK OFFICE
CERTIFICATE OF CORRECTION

PATENT NO. : 5,196,137
DATED : March 23, 1993
INVENTOR(S) : Abid N. Merchant

It is certified that error appears in the above-identified patent and that said Letters Patent is hereby corrected as shown below:

Column 10, line 20, change "12.3° C" to --42.3° C--.

Signed and Sealed this

Twenty-eighth Day of December, 1993

Attest:

BRUCE LEHMAN

Attesting Officer            Commissioner of Patents and Trademarks